United States Patent
Hoke et al.

(10) Patent No.: US 8,637,426 B2
(45) Date of Patent: Jan. 28, 2014

(54) ZONED CATALYSTS FOR DIESEL APPLICATIONS

(75) Inventors: Jeffrey B. Hoke, North Brunswick, NJ (US); Joseph C. Dettling, Howell, NJ (US)

(73) Assignee: BASF Corporation, Florham Park, NJ (US)

( * ) Notice: Subject to any disclaimer, the term of this patent is extended or adjusted under 35 U.S.C. 154(b) by 734 days.

(21) Appl. No.: 12/755,032

(22) Filed: Apr. 6, 2010

(65) Prior Publication Data

US 2010/0257843 A1 Oct. 14, 2010

Related U.S. Application Data

(60) Provisional application No. 61/167,575, filed on Apr. 8, 2009.

(51) Int. Cl.
*B01J 23/42* (2006.01)
*B01J 23/44* (2006.01)
*B01J 21/00* (2006.01)
*F01N 3/00* (2006.01)

(52) U.S. Cl.
USPC .............. 502/339; 60/274; 502/74; 502/333; 502/334

(58) Field of Classification Search
None
See application file for complete search history.

(56) References Cited

U.S. PATENT DOCUMENTS

| | | | |
|---|---|---|---|
| 4,335,023 A | 6/1982 | Dettling et al. | |
| 4,961,917 A | 10/1990 | Byrne | |
| 5,516,497 A | 5/1996 | Speronello et al. | |
| 6,375,910 B1 | 4/2002 | Deeba et al. | |
| 2004/0001782 A1* | 1/2004 | Kumar et al. | 422/180 |
| 2006/0039843 A1 | 2/2006 | Patchett et al. | |
| 2008/0045405 A1 | 2/2008 | Beutel et al. | |

FOREIGN PATENT DOCUMENTS

WO 2006046389 A1 5/2006

* cited by examiner

*Primary Examiner* — Milton I Cano
*Assistant Examiner* — Sarah A Slifka
(74) *Attorney, Agent, or Firm* — Melanie L. Brown

(57) ABSTRACT

An oxidation catalyst composite, methods and systems for the treatment of exhaust gas emissions from an advanced combustion engine, such as the oxidation of unburned hydrocarbons (HC), and carbon monoxide (CO) and the reduction of nitrogen oxides (NOx) from a diesel engine and an advanced combustion diesel engine are disclosed. More particularly, washcoat compositions are disclosed comprising at least two washcoat layers, a first washcoat comprising a palladium component and a second washcoat containing platinum and at least about 50% of the total platinum is located in the rear of the catalyst.

22 Claims, 5 Drawing Sheets

ZONED CATALYSTS FOR DIESEL APPLICATIONS

CROSS-REFERENCE TO RELATED APPLICATIONS

This application claims the benefit of priority under 35 USC §119(e) to U.S. Provisional Application Ser. No. 61/167,575, filed Apr. 8, 2009, which is incorporated herein by reference.

TECHNICAL FIELD

Embodiments of the present invention are directed to oxidation catalysts that have zoned designs. More specifically, embodiments are directed to zoned catalyst formulations comprising Pt and Pd on refractory metal oxide supports for example Ce-containing supports, and their use for reducing carbon monoxide and hydrocarbons in diesel engine and advanced combustion diesel engine systems.

BACKGROUND

Operation of lean burn engines, e.g., diesel engines and lean burn gasoline engines, provide the user with excellent fuel economy, and compared to spark-ignited stoichiometric gasoline engines, have significantly lower emissions of gas phase hydrocarbons and carbon monoxide due to their operation at high air/fuel ratios under fuel lean conditions. Emissions of diesel engines include particulate matter (PM), nitrogen oxides ($NO_x$), unburned hydrocarbons (HC) and carbon monoxide (CO). $NO_x$ is a term used to describe various chemical species of nitrogen oxides, including nitrogen monoxide (NO) and nitrogen dioxide ($NO_2$), among others.

There are major differences between catalyst systems used to treat diesel engine exhaust gas and gasoline engine exhaust gas. A significant difference between the two types of engines and their operation is that gasoline engines are spark ignited and operate within a stoichiometric air to fuel ratio, and diesel engines are compression ignition engines that operate with a large excess of air. The emissions from these two types of engines are very different and require completely different catalyst strategies. Generally, the treatment of diesel emissions is more complicated than gasoline engine emissions treatment due to the formation of high amounts of NOx and particulate matter in diesel engines.

The two major components of exhaust particulate matter are the soluble organic fraction (SOF) and the soot fraction (soot). The SOF condenses on the soot in layers, and is derived from unburned diesel fuel and lubricating oils. The SOF can exist in diesel exhaust either as a vapor or as an aerosol (fine droplets of liquid condensate) depending on the temperature of the exhaust gas. Soot is predominately composed of particles of carbon. The particulate matter from diesel exhaust is highly respirable due to its fine particle size, which poses health risks at higher exposure levels. Moreover, the SOF contains polycyclic aromatic hydrocarbons, some of which are suspected carcinogens.

Diesel engines utilizing new advanced combustion technologies such as Homogeneous Charge Compression Ignition (HCCI) will be able to reduce engine out $NO_x$ and particulate matter (PM) emissions by reducing the combustion flame temperature within the engine cylinder and by increasing the uniformity and mixing of the fuel charge prior to ignition. Generally, the emitted exhaust gas prior to any treatment contains significantly reduced particulate matter and $NO_x$ as compared to the exhaust gas emitted from traditional diesel engines. In some instances, the $NO_x$ emissions from such advanced combustion diesel engines is two to three times lower than the emissions from traditional diesel engines. However, in the process of changing the combustion process to lower $NO_x$ and PM emissions, the overall quantity of CO and hydrocarbon (HC) emissions will increase, the nature of the HCs formed will change (e.g. more methane may be produced), and the exhaust temperature may be lowered. In some instances, the CO and HC emissions from advanced combustion diesel engines is 50% to about 100% higher than the HC and CO emissions from traditional diesel engines. Since these exhaust characteristics will create significant challenges for current diesel emission catalyst technology, new catalyst formulations are needed in order to meet increasingly stringent environmental regulations such as Euro 6 and US Tier 2 Bin 5.

Oxidation catalysts comprising a precious metal dispersed on a refractory metal oxide support are known for use in treating the exhaust of diesel engines in order to convert both hydrocarbon and carbon monoxide gaseous pollutants by catalyzing the oxidation of these pollutants to carbon dioxide and water. Such catalysts have been generally contained in units called diesel oxidation catalysts (DOC), or more simply catalytic converters or catalyzers, which are placed in the exhaust flow path from diesel power systems to treat the exhaust before it vents to the atmosphere. Typically, the diesel oxidation catalysts are formed on ceramic or metallic substrate carriers (such as the flow-through monolith carrier, as described herein below) upon which one or more catalyst coating compositions are deposited. In addition to the conversions of gaseous HC and CO emissions and particulate matter (SOF portion), oxidation catalysts that contain platinum group metals (which are typically dispersed on a refractory oxide support) promote the oxidation of nitric oxide (NO) to $NO_2$.

Catalysts used to treat the exhaust of internal combustion engines are less effective during periods of relatively low temperature operation, such as the initial cold-start period of engine operation, because the engine exhaust is not at a temperature sufficiently high for efficient catalytic conversion of noxious components in the exhaust. Oxidation catalysts comprising a platinum group metal dispersed on a refractory metal oxide support are known for use in treating exhaust gas emissions from diesel engines. Platinum (Pt) is an effective metal for oxidizing CO and HC in a DOC after high temperature aging under lean conditions and in the presence of fuel sulfur. On the other hand, Pd-rich DOC catalysts typically show higher light-off temperatures for oxidation of CO and HC, especially when used to treat exhaust containing high levels of sulfur (from high sulfur containing fuels) or when used with HC storage materials. "Light-off" temperature for a specific component is the temperature at which 50% of that component reacts. Pd-containing DOCs may poison the activity of Pt to convert hydrocarbons and/or oxidize $NO_x$ and may also make the catalyst more susceptible to sulfur poisoning. These characteristics have typically prevented the use of Pd-rich oxidation catalysts in lean burn operations, especially for light duty diesel applications where engine temperatures remain below 250° C. for most driving conditions.

Although platinum (Pt) has good light-off characteristics for CO and HC and, therefore, has historically been the preferred precious metal of choice for catalyst compositions used to abate diesel engine exhaust, palladium (Pd) recently has become of greater interest due to its relatively lower cost. In some cases, palladium has proven to be suitable in DOC catalysts in conjunction with platinum to reduce the required amount of platinum, despite it being more sensitive to sulfur and somewhat less reactive on a weight basis. In fact, the combination of Pt and Pd may be more active than Pt alone. Due to the lower reactivity of palladium in DOC catalysts, it is important to ensure that it is located in the DOC catalyst in a way that does not inhibit its performance.

Oxygen storage components such as cerium are not typically mixed with DOCs because the combination would result in the platinum remaining in the oxidized state. Since normal diesel engines operate under constantly lean conditions, the platinum would have no opportunity to be reduced to the active metallic form.

As emissions regulations become more stringent, there is a continuing goal to develop diesel oxidation catalyst systems that provide improved performance, for example, lower light-off temperature. There is also a goal to utilize components of DOCs, for example, palladium, as efficiently as possible.

SUMMARY

One aspect of the present invention is directed to an oxidation catalyst composite for abatement of exhaust gas emissions from an engine comprising a carrier substrate having a length, an inlet end and an outlet end, a diesel oxidation catalyst catalytic material on the carrier, the diesel oxidation catalyst catalytic material including a first washcoat zone and a second washcoat zone. The first washcoat zone comprises a first washcoat layer including one or more of platinum (Pt) and palladium (Pd) components and a first refractory metal oxide support. The first washcoat zone is adjacent the inlet end of the carrier substrate. The second washcoat zone comprises a second washcoat layer including one or more of platinum and palladium components and a second refractory metal oxide support. The second washcoat layer is adjacent the outlet end of the carrier substrate. At least about 50% of the total palladium components are located in the first washcoat zone and at least 50% of the platinum components are located in the second washcoat zone.

In one embodiment, the second washcoat layer is substantially free of palladium. In one or more embodiments, the first washcoat zone extends over the entire length of the substrate and the second washcoat zone overlaps at least a portion of the first washcoat zone. In one or more embodiments, the first washcoat zone extends from the inlet end along about 5% to 95% of the length of the substrate and the second washcoat zone extends from the outlet end along about 5% to 95% of the length of the substrate.

In one or more embodiments, one of the first washcoat zone and the second washcoat zone overlap the other. According to one or more embodiments, the platinum and palladium are present in a total platinum to palladium ratio of from about 1:10 to about 4:1. In one or more embodiments, the catalytic material is effective to oxidize HC and CO emitted from an advanced combustion diesel engine, including a methane component, the first washcoat layer being active for oxidizing CO and HCs under high emission and low temperature conditions associated with advanced combustion diesel engine operation.

According to one or more embodiments, one or both of the first refractory metal oxide support and the second refractory metal oxide support comprises one or more of alumina, silica, zirconia, titania and combinations thereof and the second refractory oxide support comprises one or more of alumina, silica, zirconia, titania and combinations thereof. In one or more embodiments, one or both of the first and second washcoat layers further comprises one or more of zeolites, alkaline earth oxides, rare earth oxides and base metal oxides.

In one or more embodiments, the composite further comprises an undercoat layer containing substantially no precious group metal component, the undercoat layer applied to the carrier substrate beneath one or both of the first washcoat zone and the second washcoat zone. In one or more embodiments, the first support comprises ceria and a molecular sieve comprising a zeolite selected from beta-zeolite, ZSM-5, or zeolite-Y. According to one or more embodiments, the catalyst composite has a total loading of platinum and palladium in the range of about 30 g/ft$^3$ to 350 g/ft$^3$.

Another aspect of the invention pertains to methods for treating a traditional diesel exhaust gas stream or an advanced combustion diesel exhaust gas stream. One embodiment of a method comprises passing the exhaust gas stream through a DOC. The exhaust gas first passes through a first washcoat zone comprising a first washcoat layer including one or more of platinum (Pt) and palladium (Pd) components and a first refractory metal oxide support. The exhaust gas stream then passes through a second washcoat zone comprising a second washcoat layer including one or more of platinum and palladium components and a second refractory metal oxide support. At least about 50% of the total palladium components are located in the first washcoat zone and at least 50% of the platinum components are located in the second washcoat zone.

In one or more embodiments of the method, the second washcoat layer is substantially free of palladium. In one or more embodiments of the method, the first washcoat zone extends over the entire length of the substrate and the second washcoat zone completely overlaps the first washcoat zone. According to one or more embodiments of the method, the first washcoat zone extends from the inlet end along about 5% to 95% of the length of the substrate and the second washcoat zone extends from the outlet end along about 5% to 95% of the length of the substrate.

In one or more embodiments of the method, the first zone and the second washcoat zone overlap the other. In one or more embodiments of the method, the platinum and palladium are present in the overall catalyst composite in a platinum to palladium ratio of from about 1:10 to about 4:1.

According to one or more method embodiments, one or both of the first refractory metal oxide support and the second refractory metal oxide support comprises one or more of alumina, silica, zirconia, titania and combinations thereof and the second refractory oxide support comprises one or more of alumina, silica, zirconia, titania and combinations thereof. In one or more method embodiments, one or both of the first and second washcoat layers further comprises one or more of zeolites, alkaline earth oxides, rare earth oxides and base metal oxides. According to one or more embodiments of the method, the diesel oxidation catalyst composition further comprises an undercoat layer containing substantially no precious group metal component, the undercoat layer applied to the carrier substrate beneath one or more of the first washcoat zone and the second washcoat zone.

In one or more embodiments of the method, the first support comprises ceria and the molecular sieve comprises a zeolite selected from beta-zeolite, ZSM-5 or zeolite-Y. One or more method embodiments may further comprise directing diesel exhaust gas to a selective catalytic reduction (SCR) catalytic article located downstream of the catalyzed soot filter (CSF). One or more method embodiments may entail oxidizing CO and HCs under high emission and low temperature conditions associated with advanced combustion diesel engine operation.

Another aspect of the invention pertains to traditional diesel or advanced combustion diesel engine exhaust gas treatment systems. The systems comprising a catalyst composite of the type described above according to any of the above embodiments, and one or more of a soot filter, a catalyzed soot filter, a selective catalytic reduction (SCR) catalytic article and a $NO_x$ storage and reduction (NSR) catalytic article.

DETAILED DESCRIPTION

Figure 1:
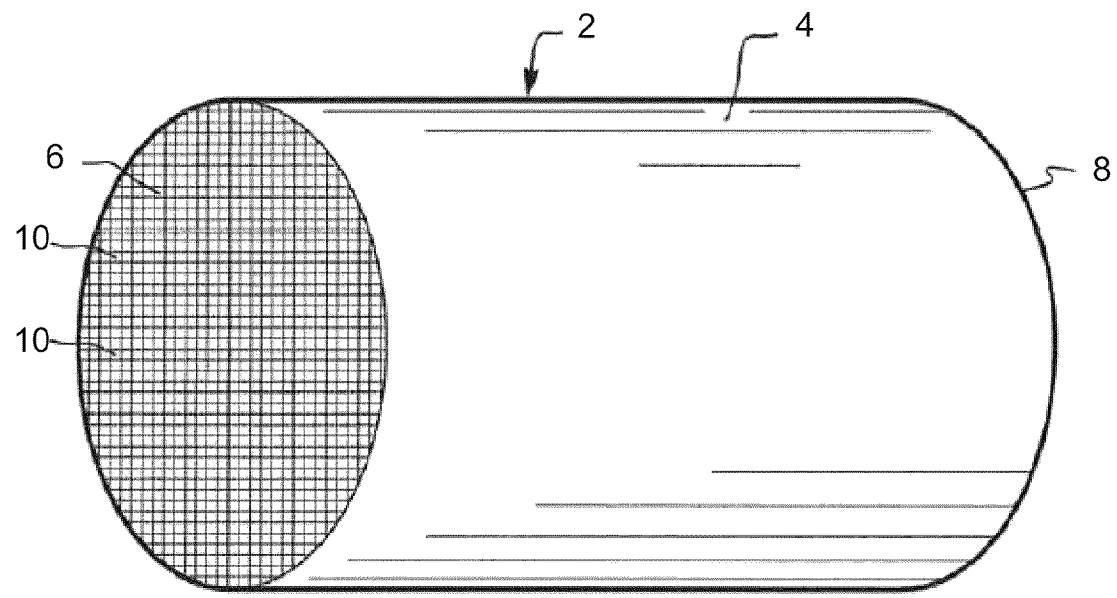
FIG. 1 is a perspective view of a honeycomb-type refractory carrier member which may comprise a diesel oxidation catalyst (DOC) washcoat composition in accordance with the present invention.

Before describing several exemplary embodiments of the invention, it is to be understood that the invention is not limited to the details of construction or process steps set forth in the following description. The invention is capable of other embodiments and of being practiced or being carried out in various ways.

Embodiments of the invention are directed to the use of catalyst zoning strategies that can enhance the performance of Pt/Pd catalysts in diesel engine applications, particularly advanced combustion applications. Diesel engines utilizing new advanced combustion technologies such as Homogeneous Charge Compression Ignition (HCCI) will be able to reduce engine out NOx and particulate matter (PM) emissions by reducing the combustion flame temperature within the engine cylinder and by increasing the uniformity and mixing of the fuel charge prior to ignition. However, in changing the combustion process to lower NOx and PM emissions, the overall quantity of CO and hydrocarbon (HC) emissions will increase, the nature of the HCs formed will change (e.g., more methane may be produced), and the exhaust temperature may be lowered. Since these exhaust characteristics will create significant challenges to current diesel emission catalyst systems, new catalyst technologies are needed in order to meet increasingly stringent environmental regulations, such as Euro 6 and US Tier 2 Bin 5.

Although platinum has good light-off characteristics for CO and HC, and has been a preferred precious metal for catalyst compositions to abate diesel engine exhaust, palladium has recently become of more interest due to its relatively lower cost. For advanced combustion engines, palladium may also have several performance advantages over platinum. For example, platinum is susceptible to inhibition (i.e., poisoning) by CO at high concentrations, and Pt exhibits poor performance as a methane oxidizer. Palladium, however, is not self-inhibited by CO and is known to be more effective than platinum for methane oxidation. Since increased CO and methane emissions are expected from advanced combustion diesel engines, use of Pd may have significant benefit.

Zone coating of catalyst washcoat is a technique often utilized by those skilled in the art to improve catalyst performance under transient engine operation. This is usually accomplished by segregating the precious metal composition and/or the amount of precious metal, into specific locations (or zones) throughout a carrier substrate (e.g., a monolithic catalyst honeycomb carrier.) In addition, zone coating allows for the placement of base metal oxide washcoat material and other washcoat additives in specific locations that best enhance the performance of the supported precious metals. Frequently, an increased amount of precious metal (particularly Pt) is localized on the front (inlet) portion of the carrier to achieve faster light-off for CO and HC oxidation. Palladium is often localized on the rear (outlet) portion of the carrier since the carrier outlet is generally hotter due to catalyst light-off, and Pd has better resistance to thermal sintering than Pt. Embodiments of the present invention use a catalyst zoning strategy that can enhance the performance of Pt/Pd formulations in diesel applications by localizing a higher percentage of Pd in the front zone of the carrier with a corresponding higher percentage of Pt in the rear zone of the carrier. This zoning strategy may be particularly useful for destroying high levels of CO and HC (especially methane) associated with advanced combustion diesel engines. Since higher levels of CO and HC from the engine will be reacted over the Pd-enhanced inlet zone, the corresponding higher localized temperatures expected at the metal sites in this location will enhance the oxidation of methane even at overall lower exhaust temperatures. Additionally, the higher Pd enhanced inlet will be less susceptible to CO poisoning at low exhaust temperatures when CO and HC concentrations will be high.

The zoning strategy of the present invention goes against conventional wisdom by placing the majority of the platinum in the hottest portion of the carrier, where it may be more likely to sinter. The zone placement of the palladium and platinum has resulted in catalyst components with surprisingly high CO and HC conversion rates, even after aging.

The scope of the various embodiments of the invention includes all catalyst washcoat formulations and combinations in which greater than about 50% of the total palladium is applied to the front (inlet) zone of the carrier substrate and greater than about 50% of the total platinum is applied to the rear (outlet) zone. Surprisingly, outlet zones with no palladium demonstrate the greatest CO and HC conversion rates. Most surprisingly, embodiments of the invention demonstrate excellent CO and HC conversion in standard diesel engines.

In one or more embodiments, the second zone is substantially free of an oxygen storage component. In one or more embodiments, the second zone is substantially free of palladium. In one or more embodiments, the first zone is substantially free of molecular sieves or zeolites. In one or more embodiments, the second zone is substantially free of non-zeolite supported-precious metal components. In one or more embodiments, one or more of the first zone and the second zone are substantially free of non-precious metal components. In one or more embodiments, the diesel oxidation catalyst material is substantially free of base metals in quantities suitable for NOx (nitrogen oxides) storage; such base metals include, but are not limited to Ba, Mg, K, and La, and the like. In other embodiments, the catalytic material is free of rhodium. In one or more embodiments, the zeolite comprises a beta-zeolite, ZSM-5 or zeolite-Y.

In particular embodiments of the invention, the catalyst composite, catalyst systems and methods are particularly suited for treating the exhaust gas emissions from an advanced combustion diesel engine exhaust characterized by and distinguished from traditional diesel engine exhaust as having higher emissions of HC and CO (in some instances 50% to 100% higher) and lower emissions of $NO_x$ (in some instances two to three times lower) than traditional diesel engines. As such, one embodiment of the invention pertains to an oxidation catalyst composite for the treatment of exhaust gas emissions from an advanced combustion diesel engine, comprising a carrier substrate having a length, an inlet end and an outlet end, a diesel oxidation catalyst catalytic material on the carrier, the diesel oxidation catalyst catalytic material including a first washcoat zone and a second washcoat zone. The first washcoat zone comprises a washcoat layer including one or more of platinum (Pt) and palladium (Pd) components and a first refractory metal oxide support, and the first washcoat zone is adjacent the inlet end of the carrier substrate. The second washcoat zone comprises a second washcoat layer including one or more of platinum and palladium components and a second refractory metal oxide support, and the second washcoat layer is adjacent the outlet end of the carrier substrate, wherein at least about 50% of the total palladium components are located in the first washcoat zone and at least 50% of the platinum components are located in the second washcoat zone.

In more specific embodiments, the second washcoat layer is substantially free of palladium. In a more specific embodiment, the first washcoat layer contains a mixture of Pt and Pd and is active for oxidizing CO and HCs under the high emission and low temperature conditions associated with advanced combustion engine operation, and heat released from the first washcoat layer is available to contribute to oxidation of the methane component of the diesel exhaust. According to one embodiment, the burning of the exhaust gas components within the exhaust is sufficient to generate a localized exotherm sufficient to oxidize the methane component. In specific embodiments, the first washcoat layer extends along an upstream portion of the substrate from the inlet end and the second washcoat layer extends along a downstream portion of the substrate from the outlet end.

Reference to a catalyst composite or catalytic article means a catalytic article including a carrier substrate, for example a honeycomb substrate, having one or more washcoat layers containing a catalytic component, for example, a precious group metal component that is effective to catalyze the oxidation of HC and CO.

Reference to "essentially no," "essentially free," and "substantially free" means that the material recited is not intentionally provided in the recited layer. It is recognized, however, that the material may migrate or diffuse to the recited layer in minor amounts considered to be insubstantial (that is <10% of the material, 9%, 8%, 7%, 6%, 5%, 4%, 3%, 2%, or even 1%).

Refractory metal oxide supports refer to support particles having pores larger than 20 Å and a wide pore distribution. As defined herein, such metal oxide supports exclude molecular sieves, specifically, zeolites. In particular embodiments, high surface area refractory metal oxide supports can be utilized, e.g., alumina support materials, also referred to as "gamma alumina" or "activated alumina," which typically exhibit a BET surface area in excess of 60 square meters per gram ("$m^2/g$"), often up to about 200 $m^2/g$ or higher. Such activated alumina is usually a mixture of the gamma and delta phases of alumina, but may also contain substantial amounts of eta, kappa and theta alumina phases. Refractory metal oxides other than activated alumina can be used as a support for at least some of the catalytic components in a given catalyst. For example, bulk ceria, zirconia, alpha alumina and other materials are known for such use. Although many of these materials suffer from the disadvantage of having a considerably lower BET surface area than activated alumina, that disadvantage tends to be offset by a greater durability or performance enhancement of the resulting catalyst. "BET surface area" has its usual meaning of referring to the Brunauer, Emmett, Teller method for determining surface area by $N_2$ adsorption. Pore diameter and pore volume can also be determined using BET-type $N_2$ adsorption or desorption experiments.

As used herein, molecular sieves, such as zeolites, refer to materials, which may in particulate form support catalytic precious group metals, the materials having a substantially uniform pore distribution, with the average pore size being no larger than 20 Å. Reference to a "non-zeolite-support" in a catalyst layer refers to a material that is not a molecular sieve or zeolite and that receives precious metals, stabilizers, promoters, binders, and the like through association, dispersion, impregnation, or other suitable methods. Examples of such supports include, but are not limited to, high surface area refractory metal oxides. One or more embodiments of the present invention include a high surface area refractory metal oxide support comprising an activated compound selected from the group consisting of alumina, zirconia, silica, titania, silica-alumina, zirconia-alumina, titania-alumina, lanthana-alumina, lanthana-zirconia-alumina, baria-alumina, baria-lanthana-alumina, baria-lanthana-neodymia-alumina, zirconia-silica, titania-silica, or zirconia-titania.

Reference to "impregnated" means that a precious metal-containing solution is put into pores of a material such as a zeolite or a non-zeolite-support. In detailed embodiments, impregnation of precious metals is achieved by incipient wetness, where a volume of diluted precious metal-containing solution is approximately equal to the pore volume of the support bodies. Incipient wetness impregnation generally leads to a substantially uniform distribution of the solution of the precursor throughout the pore system of the material. Other methods of adding precious metal are also known in the art and can be used.

Reference to OSC (oxygen storage component) means a material that has multi-valence state and can actively react with oxidants such as oxygen or nitrous oxides under oxidative conditions, or with reductants such as carbon monoxide (CO) or hydrogen under reductive conditions. Typically, an oxygen storage component will comprise one or more reducible oxides of one or more rare earth metals. Examples of suitable oxygen storage components include ceria, zirconia and combinations thereof. Praseodymia can also be included as an OSC or a promoter. The OSC may include one or more promoters or modifiers, such as Y, La, Nd, Sm, Pr, and combinations thereof. OSC can be included in either layer, particularly in the context as an activator for Pd contained in those layers Reference to "advanced combustion diesel engine" is distinguished from a traditional diesel engine, and includes Homogeneous Charge Compression Ignition (HCCI), Premixed Charge Compression Ignition (PCCI), and Low Temperature Combustion (LTC) engines, which operate by reducing the combustion flame temperature within the engine cylinder and by increasing the uniformity and mixing of the fuel charge prior to ignition. Numerous variants of advanced combustion technologies are known in the art, and the above list is not meant to be inclusive of all variants. Advanced combustion diesel engine exhaust is characterized by and distinguished from traditional diesel engine exhaust as having higher emissions of HC and CO (in some instances 50% to 100% higher) and lower emissions of $NO_x$ (in some instances two to three times lower) than traditional diesel engines. More specifically, emissions from advanced combustion vehicles is typically characterized as having <0.18 g/km NOx, >2.5 g/km CO, and >0.5 g/km HC in the New Emissions Drive Cycle (NEDC). Particulate matter can also be significantly reduced in advanced combustion engines. Although the emissions from a lean burn advanced combustion diesel engine may become more like the emissions from a spark-ignited stoichiometric gasoline engine, the mode of engine operation is completely different and therefore the exhaust treatment strategy is also completely different. As will be appreciated by the skilled artisan, the exhaust gas characteristics and mode of engine operation of advanced combustion diesel engines being different than traditional diesel engines and gasoline spark-ignited engines will require different treatment strategies and/or catalyst compositions for the effective treatment of HC, CO and $NO_x$ than has been previously used for diesel and spark ignited engines.

Details of the components of a gas treatment article and system according to embodiments of the invention are provided below.

The Carrier

According to one or more embodiments, the carrier may be any of those materials typically used for preparing DOC catalysts and will preferably comprise a metal or ceramic honeycomb structure. Any suitable carrier may be employed, such as a monolithic carrier of the type having a plurality of fine, parallel gas flow passages extending therethrough from an inlet or an outlet face of the carrier, such that passages are open to fluid flow therethrough. The passages, which are essentially straight paths from their fluid inlet to their fluid outlet, are defined by walls on which the catalytic material is coated as a "washcoat" so that the gases flowing through the passages contact the catalytic material. The flow passages of the monolithic carrier are thin-walled channels which can be of any suitable cross-sectional shape and size such as trapezoidal, rectangular, square, sinusoidal, hexagonal, oval, circular, etc. Such structures may contain from about 60 to about 600 or more gas inlet openings (i.e., "cells") per square inch of cross section.

The ceramic carrier may be made of any suitable refractory material, e.g., cordierite, cordierite-α alumina, silicon nitride, silicon carbide, zircon mullite, spodumene, alumina-silica magnesia, zircon silicate, sillimanite, magnesium silicates, zircon, petalite, α-alumina, aluminosilicates and the like.

The carriers useful for the layered catalyst composites of the present invention may also be metallic in nature and may be composed of one or more metals or metal alloys. The metallic carriers may be employed in various shapes such as corrugated sheet or monolithic form. Suitable metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt % of the alloy, e.g., 10-25 wt % of chromium, 3-8 wt % of aluminum and up to 20 wt % of nickel. The alloys may also contain small or trace amounts of one or more other metals such as manganese, copper, vanadium, titanium and the like. The surface or the metal carriers may be oxidized at high temperatures, e.g., 1000° C. and higher, to improve the corrosion resistance of the alloy by forming an oxide layer on the surface the carrier. Such high temperature-induced oxidation may enhance the adherence of the refractory metal oxide support and catalytically-promoting metal components to the carrier.

Preparation of Catalyst Composites

The catalyst composites of the present invention may be formed in a single layer or multiple layers. In some instances, it may be suitable to prepare one slurry of catalytic material and use this slurry to form multiple layers on the carrier. The composites can be readily prepared by well known processes. A representative process is set forth below. As used herein, the term "washcoat" has its usual meaning in the art of a thin, adherent coating of a catalytic or other material applied to a substrate carrier material, such as a honeycomb-type carrier member, which is sufficiently porous to permit the passage therethrough of the gas stream being treated.

The catalyst composite can be readily prepared in layers on a monolithic carrier. For a first layer of a specific washcoat, finely divided particles of a high surface area refractory metal oxide such as gamma alumina are slurried in an appropriate vehicle, e.g., water. The carrier may then be dipped one or more times in such slurry or the slurry may be coated on the carrier such that there will be deposited on the carrier the desired loading of the metal oxide, e.g., about 0.5 to about 2.5 $g/in^3$ per dip. To incorporate components such as precious metals (e.g., palladium, rhodium, platinum, and/or combinations of the same) and stabilizers and/or promoters, such components may be incorporated in the slurry prior to carrier coating as a mixture of water soluble or water-dispersible compounds or complexes. Thereafter, the coated carrier is calcined by heating, e.g., at 400-600° C. for about 10 minutes to about 3 hours. Typically, when palladium is desired, the palladium component is utilized in the form of a compound or complex to achieve dispersion of the component on the refractory metal oxide support, e.g., activated alumina. For the purposes of the present invention, the term "palladium component" means any compound, complex, or the like which, upon calcination or use thereof, decomposes or otherwise converts to a catalytically active form, usually the metal or the metal oxide. Water-soluble compounds or water-dispersible compounds or complexes of the metal component may be used as long as the liquid medium used to impregnate or deposit the metal component onto the refractory metal oxide support particles does not adversely react with the metal or its compound or its complex or other components which may be present in the catalyst composition and is capable of being removed from the metal component by volatilization or decomposition upon heating and/or application of a vacuum. In some cases, the completion of removal of the liquid may not take place until the catalyst is placed into use and subjected to the high temperatures encountered during operation. Generally, both from the point of view of economics and environmental aspects, aqueous solutions of soluble compounds or complexes of the precious metals are utilized. Non-limiting examples of suitable compounds include palladium nitrate, tetraammine palladium nitrate, platinum chloride and platinum nitrate. During the calcination step, or at least during the initial phase of use of the composite, such compounds are converted into a catalytically active form of the metal or a compound thereof.

A suitable method of preparing any layer of the layered catalyst composite of the invention is to prepare a mixture of a solution of a desired precious metal compound (e.g., a palladium compound) and at least one support, such as a finely divided, high surface area, refractory metal oxide support, e.g., gamma alumina, which is sufficiently dry to absorb substantially all of the solution to form a wet solid which is later combined with water to form a coatable slurry. In one or more embodiments, the slurry is acidic, having, for example, a pH of about 2 to less than about 7. The pH of the slurry may be lowered by the addition of an adequate amount of an inorganic acid or an organic acid to the slurry. Combinations of both can be used when compatibility of acid and raw materials is considered. Inorganic acids include, but are not limited to, nitric acid. Organic acids include, but are not limited to, acetic, propionic, oxalic, malonic, succinic, glutamic, adipic, maleic, fumaric, phthalic, tartaric, citric acid and the like. Thereafter, if desired, water-soluble or water-dispersible compounds and/or stabilizers, e.g., barium acetate, and a promoter, e.g., lanthanum nitrate, may be added to the slurry.

In one embodiment, the slurry is thereafter comminuted to result in substantially all of the solids having particle sizes of less than about 20 microns, i.e., between about 0.1-15 microns, in an average diameter. The comminution may be accomplished in a ball mill or other similar equipment, and the solids content of the slurry may be, e.g., about 20-60 wt %, more particularly about 30-40 wt %.

Additional layers, i.e., second and third layers may be prepared and deposited upon the first layer in the same manner as described above for deposition of the first layer upon the carrier.

Providing coated, multi-zoned catalyst substrates can be done by methods know in the art, for example, as described in U.S. Pat. No. 7,189,376, incorporated herein by reference in its entirety.

As noted above, palladium (Pd) recently has become of greater interest for use in DOCs due to its relatively lower cost. However, cost is not the only factor to consider in the design of an automotive catalyst composition. Regardless of cost, if a particular catalyst material is susceptible to poisoning or degradation in a particular engine exhaust environment, that particular material will not be utilized in a catalyst composition if the catalyst composition will be poisoned or degraded over time. In embodiments related to advanced combustion diesel engines, Pd may have several performance advantages over Pt. For example, Pt is susceptible to inhibition (i.e. poisoning) by CO at high concentrations, and Pt has very poor performance for oxidation of methane. Pd, on the other hand, is not self-inhibited by CO and is known to be more effective than Pt for methane oxidation. Since increased CO and methane emissions are expected from advanced combustion diesel engines, use of Pd may have a significant benefit.

Because of unstable combustion characteristics under cold-start conditions, advanced combustion engines likely will be started in a conventional mode which generates lower CO and HC emissions. As quickly as possible (e.g. after 1-2 minutes), the engine will be brought into the "advanced combustion mode" to lower engine out NOx and PM emissions. The catalyst must remain active under both operation modes and therefore be able to handle large extremes in the CO and HC emissions. Although conventional Pt or Pt/Pd based catalysts show good CO and HC performance under conventional diesel operating conditions, their light-off temperature significantly increases with higher engine-out CO and HC levels. Furthermore, once the catalyst is activated and operating in the "advanced combustion mode", it must be able to effectively oxidize these components even as the overall engine-out temperature drops.

Figure 2:
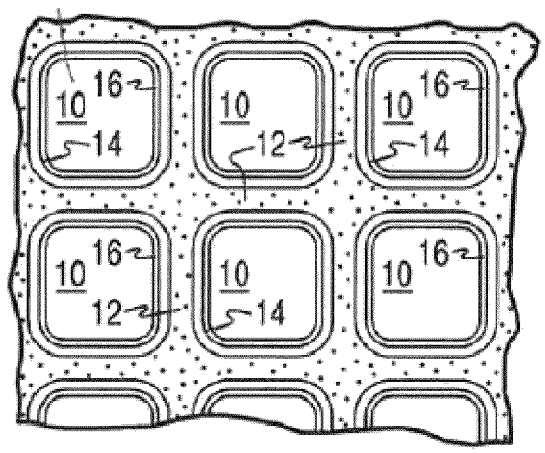
FIG. 2 is a partial cross-sectional view enlarged relative to FIG. 1 and taken along a plane parallel to the end faces of the carrier of FIG. 1, which shows an enlarged view of one of the gas flow passages shown in FIG. 1.

The catalyst composite according to one or more embodiments of the present invention may be more readily appreciated by reference to FIGS. 1 and 2. FIGS. 1 and 2 show a refractory carrier member 2, in accordance with one embodiment of present invention. Referring to FIG. 1, the refractory carrier member 2 is a cylindrical shape having a cylindrical outer surface 4, an upstream end face 6 and a downstream end face 8, which is identical to end face 6. Carrier member 2 has a plurality of fine, parallel gas flow passages 10 formed therein. As seen in FIG. 2, flow passages 10 are formed by walls 12 and extend through carrier 2 from upstream end face 6 to downstream end face 8, the passages 10 being unobstructed so as to permit the flow of a fluid, e.g., a gas stream, longitudinally through carrier 2 via gas flow passages 10 thereof. As more easily seen in FIG. 2, walls 12 are so dimensioned and configured that gas flow passages 10 have a substantially regular polygonal shape, substantially square in the illustrated embodiment, but with rounded corners in accordance with U.S. Pat. No. 4,335,023, issued Jun. 15, 1982 to J. C. Dettling et al. A first washcoat layer 14, which in the art and sometimes below is referred to as a "washcoat", is adhered to or coated onto the walls 12 of the carrier member. As shown in FIG. 2, a second washcoat layer 16 is coated over the first washcoat layer 14 as described above. In one embodiment, an undercoat (not shown) can be applied to the substrate beneath the first washcoat layer 16.

As shown in FIG. 2, the carrier member includes void spaces provided by the gas-flow passages 10, and the cross-sectional area of these passages 10 and the thickness of the walls 12 defining the passages will vary from one type of carrier member to another. Similarly, the weight of washcoat applied to such carriers will vary from case to case. Consequently, in describing the quantity of washcoat or catalytic metal component or other component of the composition, it is convenient to use units of weight of component per unit volume of catalyst carrier. Therefore, the units grams per cubic inch ("g/in$^3$") and grams per cubic foot ("g/ft$^3$") are used herein to mean the weight of a component per volume of the carrier member, including the volume of void spaces of the carrier member.

In another embodiment, the washcoat layers of the present invention may be zone coated such that first washcoat layer is on the upstream end, and the second washcoat layer on the downstream end of the carrier substrate. For example, an upstream washcoat layer can be coated over a portion of the upstream region of the substrate and a downstream washcoat layer can be coated over a downstream portion of the substrate. In such embodiments, the second or downstream washcoat layer of the present invention can be at least partially coated over the first or upstream washcoat layer.

Figure 3A:
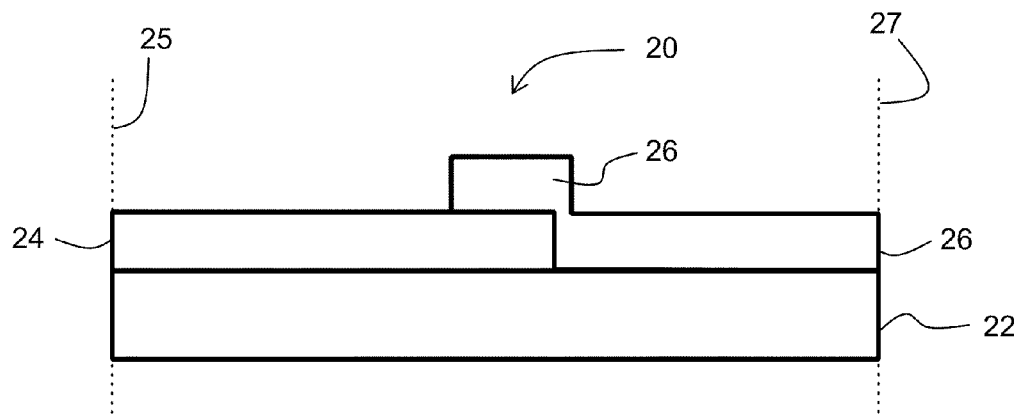
FIGS. 3A through 3D show a cross-sectional view of oxidation catalyst composites according to various embodiments of the invention.

The catalyst composite embodiment including upstream and downstream zones may be more easily understood by reference to FIGS. 3A through 3D. FIG. 3A shows an embodiment of a zoned oxidation catalyst composite 20 for abatement of exhaust gas emissions from an engine. A carrier substrate 22, for example, a honeycomb monolith, having an inlet or upstream end 25, and outlet or downstream end 27 and an axial length extending between the inlet end 25 and outlet end, contains two separate zone coated washcoat layers. A first washcoat layer 24 and a second washcoat layer 26 are applied to the substrate 22. The first washcoat layer 24 extends from the inlet or upstream end 25 and contains a first refractory metal oxide support including one or more of a platinum (Pt) and a palladium (Pd) component. A second washcoat layer 26 extends from the outlet or downstream end 27 and comprises a second refractory oxide support, and one or more of a platinum component and a palladium component. In the embodiment shown in FIG. 3A, the second washcoat zone 26 at least partially overlaps the first washcoat zone 24. The catalyst composite has at least about 50% of the total palladium components in the first washcoat zone 24 and at least about 50% of the platinum components in the second washcoat zone 26. In a detailed embodiment, the second washcoat layer is substantially free of palladium.

In some specific embodiments, the first washcoat zone 24 covers the entire length of the substrate 22, with the second washcoat zone 26 covering a portion of the length of the substrate 22. In other specific embodiments, the first washcoat zone 24 covers a portion of the length of the substrate 22 and the second washcoat zone 26 covers the entire length of the substrate 22. Either the first washcoat zone 24 or the second washcoat zone 26 can be applied to the substrate 22 first, with the other washcoat overlapping or touching it.

The length of the upstream washcoat zone 24 can also be described as a percentage of the length of the catalytic member from the upstream to downstream edge. Typically, the upstream washcoat zone 24 will comprise from about 5% to about 95% of the overall length substrate support 22. Also exemplified is an upstream washcoat zone 24 of up to about 20%, up to about 40%, and up to about 60% of the substrate 22 length. With the downstream washcoat zone 26 covering the remaining downstream portion of the substrate 22. Thus, the downstream washcoat zone 26 may comprise 95% to about 5% of axial length substrate 22.

Figure 3B:
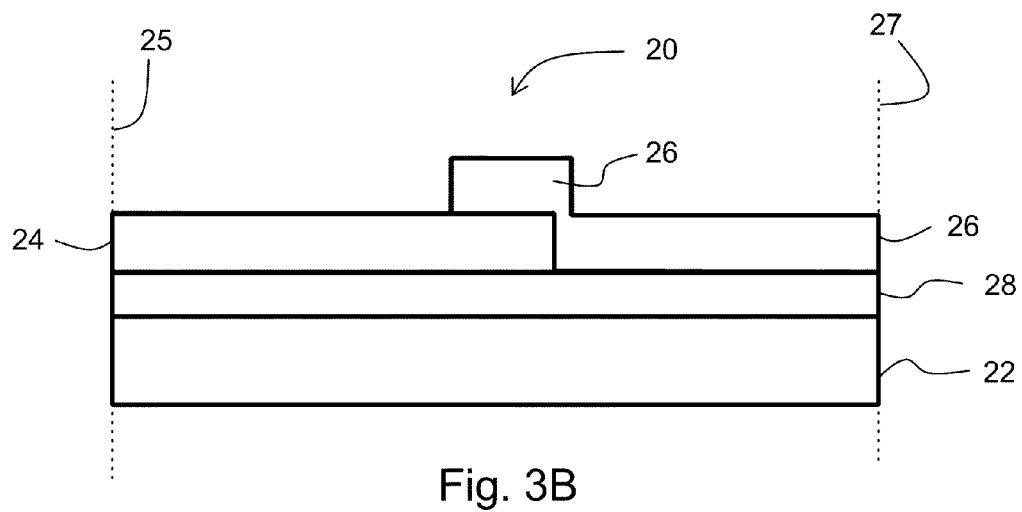

According to other embodiments, as shown in FIG. 3B, an undercoat layer 28 may be applied to the substrate prior to the first washcoat zone 24 or second washcoat zone 26, whichever is applied first. In a specific embodiment, the undercoat has no precious metal component intentionally added to the undercoat composition. For example, the undercoat may comprise a refractory oxide support. Through diffusion or migration, some palladium or platinum from the first washcoat layer may be present in the undercoat layer 28. The compositions of the first washcoat zone 24 and second washcoat zone 26 can be as described above with respect to FIG. 3A.

Figure 3C:
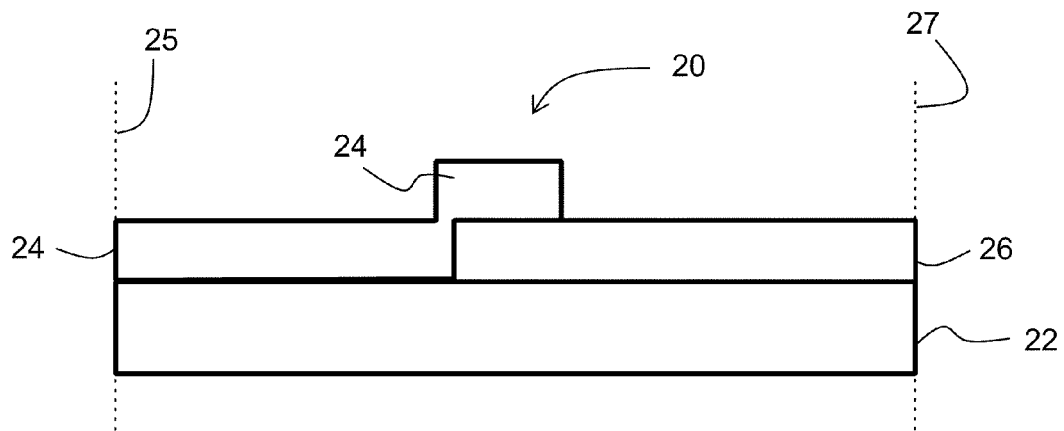

Referring now to FIG. 3C, an alternative coating strategy is shown. In this embodiment, the first washcoat zone 24 extends from the inlet end toward the outlet end. A second washcoat zone 26 is located adjacent and downstream from the first washcoat zone. The first washcoat zone 24 can at least partially overlap the second washcoat zone. In one embodiment, the first washcoat zone 24 contains a first refractory metal oxide support including at least one of a platinum and palladium component. The second washcoat zone 26 comprises a second refractory oxide support and at least one of a platinum and palladium component. In a detailed embodiment, the ratio of total platinum to total palladium is in the range of about 10:1 to about 1:10. The ratio of some aspects may be between about 10:1 to about 1:4, 4:1 to about 1:10 or 1:4 to about 4:1. The ratio may also be within the ranges of about 3:1 to about 1:3, about 2:1 to about 1:2 and about 1:1. The first washcoat zone can extend from the inlet end 25 to about 5% and up to about 95% of the axial length of the substrate 22. The second washcoat zone 26 extends from the outlet end 27, and the second washcoat zone 26 can extend from about 5% to about 95% of the axial length of the substrate 22.

Figure 3D:
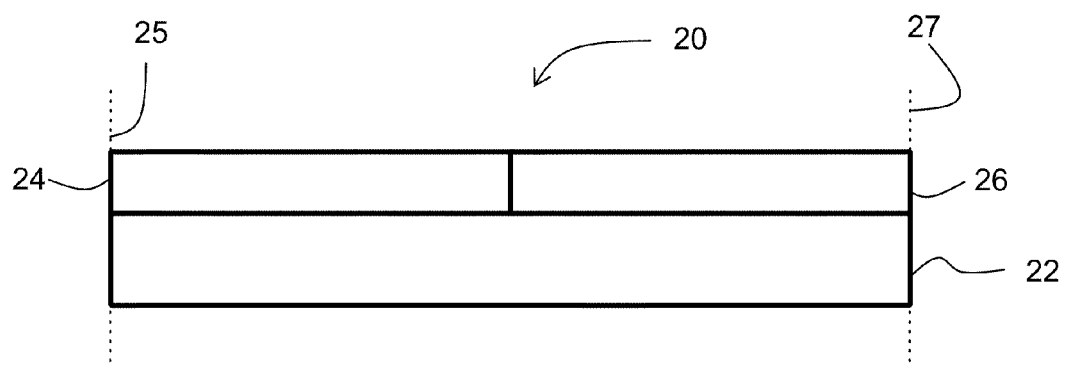

FIG. 3D shows an embodiment in which the first washcoat zone 24 and second washcoat zone 26 are located side-by-side along the length of the carrier substrate 22. The first washcoat zone 24 of specific embodiments extends from the inlet end 25 of the substrate 22 through the range of about 5% and about 95% of the length of the substrate 22. The second washcoat zone 26 extends from the outlet end 27 of the substrate 22 for about 5% to about 95% of the axial length of the substrate. The composition of the first and second washcoat layers can be as described above with respect to FIGS. 3A to 3C.

Suitable loadings for the components in the first and second washcoat layers are as follows.

The Pd component in the first washcoat layer may be present in an amount in the range of about 10 g/ft$^3$ to 200 g/ft$^3$ (including 20, 30, 40, 50, 60, 70, 80, 90, 100, 110, 120, 130, 140, 150, 160, 170, 180 and 190 g/ft$^3$). The Pt component may be present in an amount in the range of about 10 g/ft$^3$ to 140 g/ft$^3$ (including 20, 30, 40, 50, 60, 70, 80, 90, 100, 110, 120, 130 g/ft$^3$). The total loading of palladium and platinum in some aspects is in the range of about 20 g/ft$^3$ to about 400 g/ft$^3$ (including 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380 and 390 g/ft$^3$.)

The refractory oxide support, for example, alumina may be present in the range of about 0.1 to about 3 g/in$^3$, with a more specific range of about 0.5 g/in$^3$ to about 2 g/in$^3$. A molecular sieve, for example H-beta zeolite may be present in the range of about 0.1 to about 1 g/in$^3$, with a more specific range of about 0.2 to about 0.5 g/in$^3$. The support for both the first washcoat layer and/or the second washcoat layer, of various embodiments, further comprises one or more of zeolites, alkaline earth oxides, rare earth oxides and base metal oxides. In other detailed embodiments, the support further comprises ceria and a molecular sieve comprising a zeolite selected from beta-zeolite, ZSM-5 or zeolite-Y.

The diesel oxidation catalyst (DOC) composite of the present invention can be used in an integrated emission treatment system comprising one or more additional components for the treatment of diesel exhaust gas emissions. For example, the emission treatment system may further comprise a soot filter component and/or a selective catalytic reduction (SCR) catalytic article. The diesel oxidation catalyst can be located upstream or downstream from the soot filter and/or selective catalytic reduction component.

In addition to treating the exhaust gas emissions via use of an oxidation catalyst the present invention may employ a soot filter for removal of particulate matter. The soot filter may be located upstream or downstream from the DOC, but typically, the soot filter will be located downstream from the diesel oxidation catalyst. In one embodiment, the soot filter is a catalyzed soot filter (CSF). The CSF may comprise a substrate coated with a washcoat layer containing one or more catalysts for burning off trapped soot and or oxidizing exhaust gas stream emissions. In general, the soot burning catalyst can be any known catalyst for combustion of soot. For example, the CSF can be coated with one or more high surface area refractory oxides (e.g., an aluminum oxide or ceria-zirconia) for the combustion of unburned hydrocarbons and to some degree particulate matter. The soot burning catalyst can be an oxidation catalyst comprising one or more precious metal (PM) catalysts (platinum, palladium, and/or rhodium).

In general, any known filter substrate in the art can be used, including, e.g., a honeycomb wall flow filter, wound or packed fiber filter, open-cell foam, sintered metal filter, etc., with wall flow filters being preferred. Wall flow substrates useful for supporting the CSF compositions have a plurality of fine, substantially parallel gas flow passages extending along the longitudinal axis of the substrate. Typically, each passage is blocked at one end of the substrate body, with alternate passages blocked at opposite end-faces. Such monolithic carriers may contain up to about 700 or more flow passages (or "cells") per square inch of cross section, although far fewer may be used. For example, the carrier may have from about 7 to 600, more usually from about 100 to 400, cells per square inch ("cpsi"). The cells can have cross sections that are rectangular, square, circular, oval, triangular, hexagonal, or are of other polygonal shapes. Wall flow substrates typically have a wall thickness between 0.002 and 0.1 inches. Preferred wall flow substrates have a wall thickness of between 0.002 and 0.015 inches.

Typical wall flow filter substrates are composed of ceramic-like materials such as cordierite, α-alumina, silicon carbide, silicon nitride, zirconia, mullite, spodumene, alumina-silica-magnesia or zirconium silicate, or of porous, refractory metal. Wall flow substrates may also be formed of ceramic fiber composite materials. Preferred wall flow substrates are formed from cordierite and silicon carbide. Such materials are able to withstand the environment, particularly high temperatures, encountered in treating the exhaust streams.

The exhaust gas treatment system of the present invention may further comprise a selective catalytic reduction (SCR) component. The SCR component may be located upstream or downstream of the DOC and/or soot filter. Preferably, the SCR component is located downstream of a soot filter component. A suitable SCR catalyst component for use in the emission treatment system is able to effectively catalyze the reduction of the NOx component at temperatures below 600° C., so that adequate NOx levels can be treated even under conditions of low load which typically are associated with lower exhaust temperatures. Preferably, the catalyst article is capable of converting at least 50% of the NOx component to $N_2$, depending on the amount of reductant added to the system. Another desirable attribute for the composition is that it possesses the ability to catalyze the reaction of $O_2$ with any excess $NH_3$ to $N_2$ and $H_2O$, so that $NH_3$ is not emitted to the atmosphere. Useful SCR catalyst compositions used in the emission treatment system should also have thermal resistance to temperatures greater than 650° C. Such high temperatures may be encountered during regeneration of the upstream catalyzed soot filter.

Suitable SCR catalyst compositions are described, for instance, in U.S. Pat. Nos. 4,961,917 (the '917 patent) and 5,516,497, which are both hereby incorporated by reference in their entirety. Compositions disclosed in the '917 patent include one or both of an iron and a copper promoter present in a zeolite in an amount of from about 0.1 to 30 percent by weight, preferably from about 1 to 5 percent by weight, of the total weight of promoter plus zeolite. In addition to their ability to catalyze the reduction of NOx with $NH_3$ to $N_2$, the disclosed compositions can also promote the oxidation of excess $NH_3$ with $O_2$, especially for those compositions having higher promoter concentrations. The system may further include a NOx storage and release (NSR) catalytic article. In certain embodiments, one or the other of an SCR or NSR catalytic article is included in the system.

Figure 4:
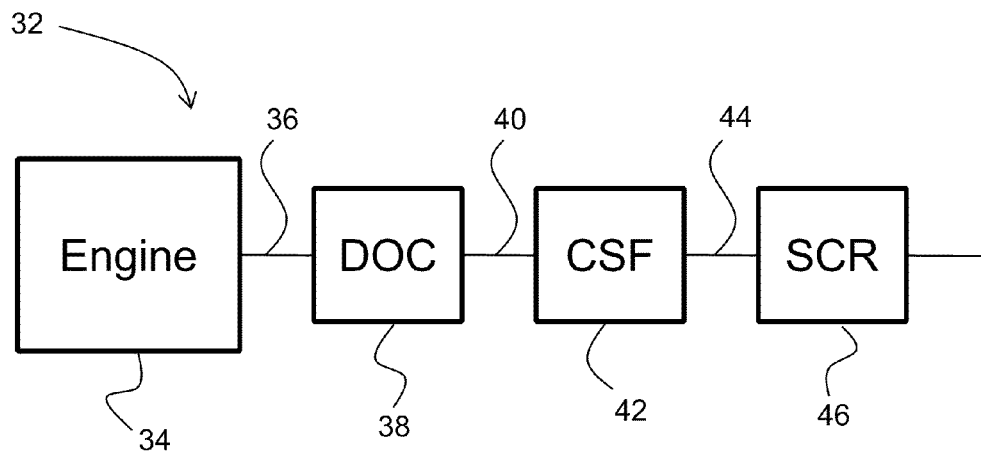
FIG. 4 is a schematic of an engine emission treatment system, in accordance with one embodiment of the present invention.

In one embodiment, the present invention is directed to an emission treatment system comprising one or more additional components for the treatment of diesel exhaust gas emissions. An exemplified emission treatment system may be more readily appreciated by reference to FIG. 4, which depicts a schematic representation of an emission treatment system 32, in accordance with this embodiment of the present invention. Referring to FIG. 4, an exhaust gas stream containing gaseous pollutants (e.g., unburned hydrocarbons, carbon monoxide and NOx) and particulate matter is conveyed via line 36 from an engine 34 to a diesel oxidation catalyst (DOC) 38, which is coated with the novel washcoat composition of the present invention. In the DOC 38, unburned gaseous and non-volatile hydrocarbons (i.e., the SOF) and carbon monoxide are largely combusted to form carbon dioxide and water. In addition, a proportion of the NO of the NOx component may be oxidized to $NO_2$ in the DOC. The exhaust stream is next conveyed via line 40 to a catalyzed soot filter (CSF) 42, which traps particulate matter present within the exhaust gas stream. The CSF 42 is optionally catalyzed for passive regeneration. After removal of particulate matter, via CSF 42, the exhaust gas stream is conveyed via line 44 to a downstream selective catalytic reduction (SCR) component 16 for the treatment and/or conversion of NOx. The DOC 38 may be placed in a close-coupled position.

One or more embodiments of the invention are directed to methods for treating a diesel exhaust gas stream comprising CO, HC and $NO_x$. The exhaust gas stream is first passed through a DOC first washcoat zone comprising a washcoat layer including one or more of platinum and palladium components and a refractory metal oxide support. The exhaust gas is then passed through a second washcoat zone comprising a second washcoat layer including one or more of palladium and platinum components and a second refractory metal oxide support. The metals are distributed so that at least about 50% of the total palladium in the first washcoat layer and at least about 50% of the total platinum is in the second washcoat layer.

In other embodiments, the diesel exhaust gas stream subsequent to contacting the second washcoat layer is directed to a catalyzed soot filter (CSF) located downstream of the diesel oxidation catalyst. In further embodiments, the diesel exhaust gas stream subsequent to contacting the catalyzed soot filter (CSF) is directed to a selective catalytic reduction (SCR) component located downstream of the catalyzed soot filter (CSF).

The DOC catalyst compositions disclosed herein may be useful as stable close-coupled catalysts. Close-coupled catalysts are placed close to an engine to enable them to reach reaction temperatures as soon as possible. In specific embodiments, the close-coupled catalyst is placed within three feet, more specifically, within one foot of the engine, and even more specifically, less than six inches from the engine. Close-coupled catalysts are often attached directly to the exhaust gas manifold. Due to their close proximity to the engine, close-coupled catalysts are preferably stable at high temperatures.

Specific embodiments according to the present invention will now be described in the following examples. The examples are illustrative only, and are not intended to limit the remainder of the disclosure in any way. Although the instant specification places emphasis on oxidation of pollutants from a diesel engine, the oxidation catalysts described herein are useful for other catalytic reactions, such as oxidation of CO and hydrocarbons in gasoline engines.

Before describing several exemplary embodiments of the invention, it is to be understood that the invention is not limited to the details of construction or process steps set forth in the following description. The invention is capable of other embodiments and of being practiced in various ways. In the following, preferred designs for the layered catalyst are provided, including such combinations as recited used alone or in unlimited combinations, the uses for which include systems and methods of other aspects of the present invention.

EXAMPLES

Reference Sample A

A washcoated Pt/Pd catalyst composition was prepared with a uniform mixture of Pd on OSC and Pt on alumina by coating Pt- and Pd-containing aqueous slurry onto a 4.66" diameter by 6" long cordierite honeycomb monolith substrate (400 cpsi with 4 mil wall thickness). The total precious metal loading was 110 g/ft$^3$, and the Pt/Pd ratio was 1:2. The Pt- and Pd-containing aqueous slurry was prepared as follows:

An OSC material comprising 20% ceria, 6% neodymia, 6% lanthana, and 68% zirconia and having a BET surface area of approximately 90 m$^2$/g was impregnated with a water soluble Pd salt using standard incipient wetness techniques. Separately, a high surface area gamma alumina having a BET surface area of approximately 150 m$^2$/g, a pore volume of approximately 0.4 cc/g, and an average pore size of approximately 50 Å was impregnated with a water soluble Pt salt using standard incipient wetness techniques. This powder was further impregnated with an organic acid. The resulting Pd/OSC and Pt/alumina impregnated powders were placed into DI water with zirconium acetate (5% of total slurry solids by weight $ZrO_2$), and the pH of the resulting aqueous slurry was reduced to 3.7 by addition of an organic acid. After reducing the particle size to 90% less than 10 um by milling using methods known in the art, the slurry was coated onto a cordierite substrate using deposition methods also known in the art. The coated monolith was dried and then calcined at 550° C. for 1 h. The total washcoat loading after calcination was approximately 1.6 g/in$^3$ with OSC material comprising approximately 1.0 g/in$^3$ and alumina comprising 0.5 g/in$^3$. A second layer was similarly applied over the first layer, and the twice-coated monolith was dried and calcined again at 550° C. for 1 h. The total washcoat loading for second layer after calcination was approximately 1.6 g/in$^3$ with OSC material comprising approximately 1.0 g/in$^3$ and alumina comprising 0.5 g/in$^3$ Reference Sample B A washcoated Pt/Pd catalyst composition was prepared with a uniform mixture of Pd on OSC, Pt on alumina, and beta zeolite by coating Pt- and Pd-containing aqueous slurry onto a 4.66" diameter by 6" long cordierite honeycomb monolith substrate (400 cpsi with 4 mil wall thickness). The total precious metal loading was 150 g/ft$^3$, and the Pt/Pd ratio was 1:2. The Pt- and Pd-containing aqueous slurry was prepared as follows:

An OSC material comprising 20% ceria, 6% neodymia, 6% lanthana, and 68% zirconia and having a BET surface area of approximately 90 m$^2$/g was impregnated with a water soluble Pd salt using standard incipient wetness techniques. Separately, a high surface area gamma alumina having a BET surface area of approximately 150 m$^2$/g, a pore volume of approximately 0.4 cc/g, and an average pore size of approximately 50 Å was impregnated with a water soluble Pt salt using standard incipient wetness techniques. This powder was further impregnated with an organic acid. The resulting Pd/OSC and Pt/alumina impregnated powders were placed into DI water with zirconium acetate (5% of total slurry solids by weight $ZrO_2$), and the pH of the resulting aqueous slurry was reduced to 3.7 by addition of an organic acid. After reducing the particle size to 90% less than 10 um by milling using methods known in the art, dry H-Beta zeolite was added. After further reducing the particle size of the slurry to 90% less than 9 um by milling, the slurry was coated onto a cordierite substrate using deposition methods also known in the art. The coated monolith was dried and then calcined at 550° C. for 1 h. The total washcoat loading after calcination was approximately 1.6 g/in$^3$ with OSC material comprising approximately 0.75 g/in$^3$, alumina comprising 0.5 g/in$^3$, and H-Beta zeolite comprising 0.25 g/in$^3$. A second layer was similarly applied over the first layer, and the twice-coated monolith was dried and calcined again at 550° C. for 1 h. The total washcoat loading for second layer after calcination was approximately 1.6 g/in$^3$ with OSC material comprising approximately 0.75 g/in$^3$, alumina comprising 0.5 g/in$^3$, and H-Beta zeolite comprising 0.25 g/in$^3$.

Reference Sample C

A washcoated Pt-only catalyst composition was prepared with a uniform mixture of Pt on silica-alumina, and beta zeolite by coating Pt-containing aqueous slurry onto a 4.66" diameter by 6" long cordierite honeycomb monolith substrate (400 cpsi with 4 mil wall thickness). The total precious metal loading was 110 g/ft$^3$. The Pt-containing aqueous slurry was prepared as follows:

A high surface area silica-alumina (5% silica) having a BET surface area of approximately 120 m$^2$/g, a pore volume of approximately 0.7 cc/g, and an average pore size >80 Å was impregnated with a water soluble Pt salt using standard incipient wetness techniques. This powder was further impregnated with an organic acid. The resulting Pt/silica-alumina impregnated powder was placed into DI water with H-beta zeolite, and the pH of the resulting aqueous slurry was reduced to 4 by addition of an organic acid. After reducing the particle size to 90% less than 12 um by milling using methods known in the art, the slurry was coated onto a cordierite substrate using deposition methods also known in the art. The coated monolith was dried and then calcined at 500° C. for 1 h. The total washcoat loading after calcination was approximately 1 g/in$^3$ with silica-alumina comprising approximately 0.75 g/in$^3$ and H-Beta zeolite comprising 0.25 g/in$^3$. A second layer was similarly applied over the first layer, and the twice-coated monolith was dried and calcined again at 500° C. for 1 h. The total washcoat loading for second layer after calcination was approximately 1 g/in$^3$ with silica-alumina material comprising approximately 0.75 g/in$^3$ and H-Beta zeolite comprising 0.25 g/in$^3$.

Zoned Samples D-G

After having the CO and HC NEDC performance measured, each of the reference samples A, B, and C were cut in half along the length (i.e. at a point halfway along the length) in order to create two 4.66" wide by 3.0" long coated monoliths corresponding to the front and rear halves of reference samples A-C. These were then combined back-to-back in specific combinations to generate comparative examples D, E, F, and G in order to simulate different zoning configurations. Comparative example D comprised the front half of reference sample C (Pt-only) and the rear half of reference sample A. Conversely, comparative example E comprised the front half of reference sample A and the rear half of reference sample C (Pt-only). Comparative example F comprised the front half of reference sample C (Pt-only) and the rear half of reference sample B. Conversely, comparative example G comprised the front half of reference sample B and the rear half of reference sample C (Pt-only). The new comparative "zoned" samples D-G were evaluated for CO and HC performance similarly to reference samples A-C as described below. Test results are given in FIGS. 5 and 6 and Table 1.

Sample Testing

The coated catalyst compositions prepared in Examples 1-3 were tested in the following manner. First the coated monoliths were mounted in the exhaust stream of a diesel test engine and then subjected to high temperature post-injection (PI) aging. This was accomplished by maintaining the temperature at the front face of the catalyst at 400° C. and then periodically injecting fuel into the exhaust gas stream in front of the catalyst. The injected fuel passed into the catalyst and was combusted, thereby increasing the temperature measured at the rear face of the catalyst. The temperature at the rear face of the catalyst was controlled by controlling the amount of fuel injected into the exhaust stream. Using this method, the temperature at the rear of the catalyst was cycled between 400° C. and 700° C. in 15 minute intervals for 25 hours (50 total cycles).

After aging, the coated monoliths were evaluated for CO and HC performance on a test engine using the European light-duty vehicle certification New Emission Drive Cycle (NEDC). The monoliths were individually mounted in the exhaust stream of a 3 L BMW M57 engine (Euro 4 calibration) that had typical engine out CO emissions of 1.6 g/km and HC emissions of 0.4 g/km over the NEDC cycle. As the engine was "driven" according to the specifications of NEDC cycle, CO and HC concentrations were monitored in front of and behind the coated monoliths in order to calculate the catalyst CO and HC conversions. After testing, the monoliths prepared in Example A-C were cut in half in order to prepare Examples D-G as described previously. Test results for the coated monoliths prepared in Examples A-G are given in FIGS. 5 and 6 and Table 1.

Figure 5:
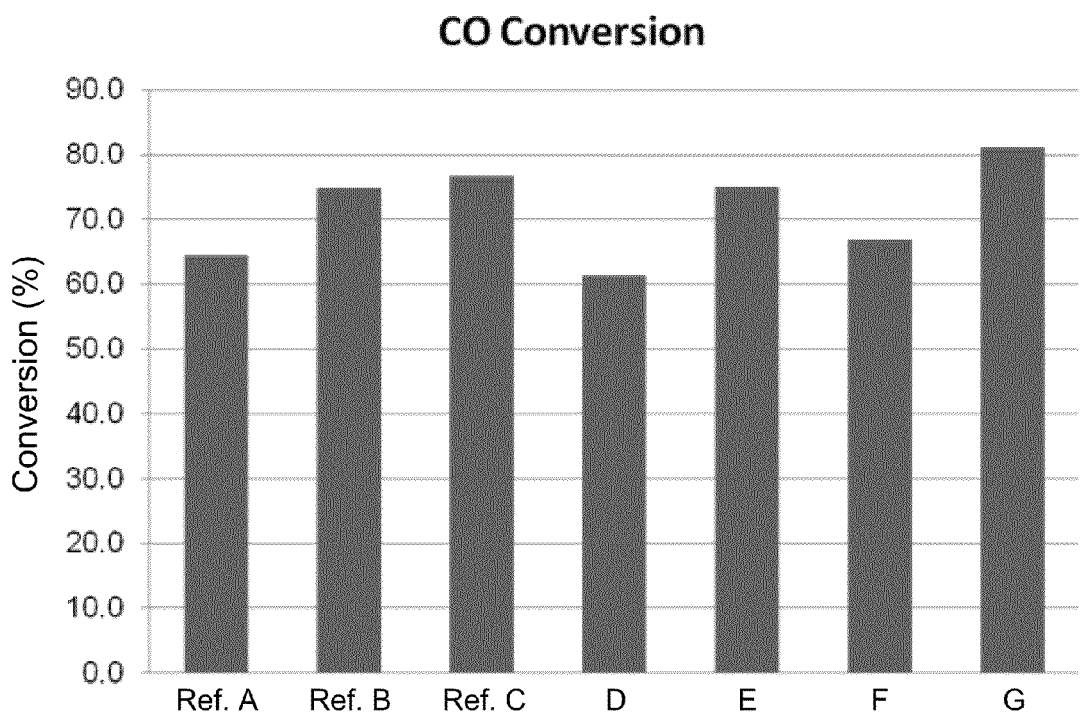
FIG. 5 is a graph of the CO conversion for various embodiments of the invention.
Figure 6:
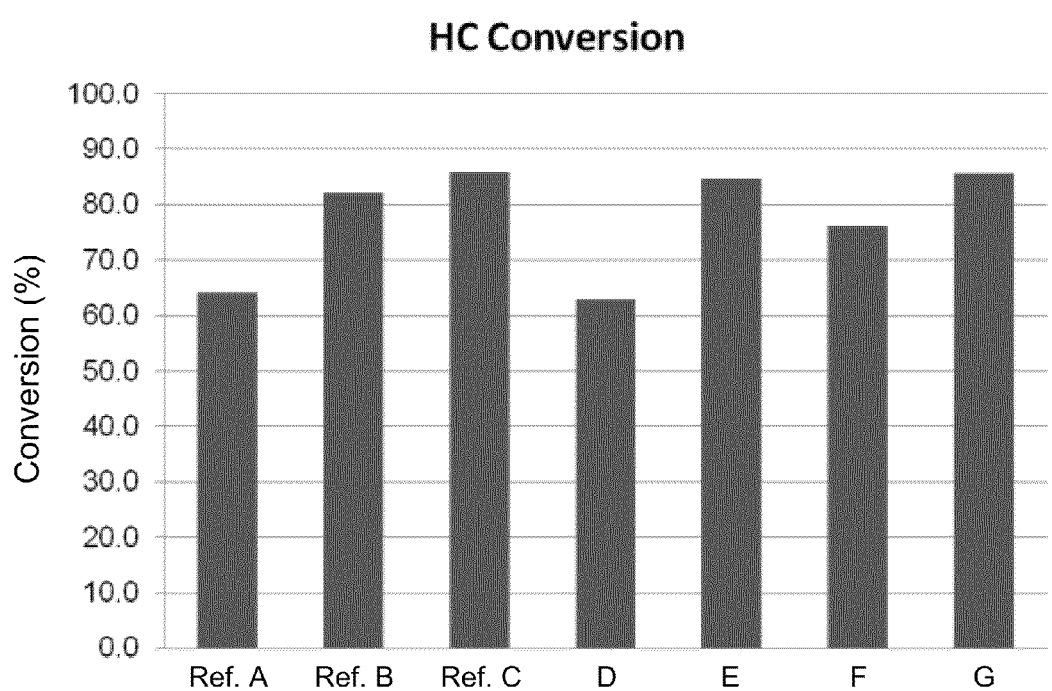
FIG. 6 is a graph of the hydrocarbon conversion for various embodiments of the invention.

As shown in FIGS. 5 and 6, diesel engine bench testing of zoned samples D-G demonstrates that the monoliths coated with Pt/Pd catalyst washcoat formulation in the front zone and a Pt-only washcoat formulation in the rear zone perform significantly better for CO and HC oxidation after 25 hours post-injection aging at 700° C. compared to monoliths zone-coated with the reverse composition and precious metal distribution. In fact, results equivalent to a state-of-the-art Pt-only DOC catalyst were achieved with this novel coating strategy (comparative examples D and F compared to reference sample C). These results were unexpected since Pt is generally believed to be more effective when it is localized in the front zone where it can be protected from the high temperature exotherms typically associated with a rear zone location. Since utilization of this novel zoning strategy demonstrates that Pt/Pd catalysts can achieve results equivalent to Pt-only, there is a significant opportunity to reduce the overall cost of the DOC. Additionally, the use of this zoning strategy may be particularly beneficial for destroying the high levels of CO and HC (especially methane) associated with advanced combustion engines. The results are summarized in the following table.

TABLE 1

| Sample | Front Zone | Rear Zone | CO Conversion | HC Conversion |
|---|---|---|---|---|
| A | | Pt/Pd (1:2) at 110 g/ft$^3$ | 64.4 | 64.2 |
| B | | Pt/Pd (1:2) at 150 g/ft$^3$ | 74.9 | 82.2 |
| C | | Pt at 110 g/ft$^3$ | 76.7 | 86.0 |
| D | Pt at 110 g/ft$^3$ | Pt/Pd (1:2) at 110 g/ft$^3$ | 61.4 | 63.0 |
| E | Pt/Pd (1:2) at 110 g/ft$^3$ | Pt at 110 g/ft$^3$ | 75.0 | 84.6 |
| F | Pt at 110 g/ft$^3$ | Pt/Pd (1:2) at 150 g/ft$^3$ | 66.8 | 76.2 |
| G | Pt/Pd (1:2) at 150 g/ft$^3$ | Pt at 110 g/ft$^3$ | 81.0 | 85.8 |

Although the various embodiments described have been demonstrated on a standard (Euro 4) diesel engine, the invention is applicable to both standard diesel and advanced combustion diesel applications.

Reference throughout this specification to "one embodiment," "certain embodiments, "one or more embodiments" or "an embodiment" means that a particular feature, structure, material, or characteristic described in connection with the embodiment is included in the invention. In addition, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. An oxidation catalyst composite for abatement of exhaust gas emissions from an engine comprising:
a carrier substrate having a length, an inlet end and an outlet end, a diesel oxidation catalyst catalytic material on the carrier, the diesel oxidation catalyst catalytic material including a first washcoat zone and a second washcoat zone;
the first washcoat zone comprising a first washcoat layer including one or more of platinum (Pt) and palladium (Pd) components and a first refractory metal oxide support, the first washcoat zone adjacent the inlet end of the carrier substrate; and
the second washcoat zone comprising a second washcoat layer including a platinum component and a second refractory metal oxide support, the second washcoat layer adjacent the outlet end of the carrier substrate, wherein at least 50% of the platinum components are located in the second washcoat zone; and wherein the second washcoat layer is substantially free of palladium.

2. The oxidation catalyst composite of claim 1, wherein the first washcoat zone extends over the entire length of the substrate and the second washcoat zone overlaps at least a portion of the first washcoat zone.

3. The oxidation catalyst composite of claim 1, wherein the first washcoat zone extends from the inlet end along about 5% to 95% of the length of the substrate and the second washcoat zone extends from the outlet end along about 5% to 95% of the length of the substrate.

4. The oxidation catalyst composite of claim 3, wherein one of the first washcoat zone and the second washcoat zone overlap the other.

5. The oxidation catalyst composite of claim 1, wherein the platinum and palladium are present in a total platinum to palladium ratio of from about 1:10 to about 4:1.

6. The oxidation catalyst composite of claim 1, wherein the catalytic material is effective to oxidize HC and CO emitted from an advanced combustion diesel engine, including a methane component, the first washcoat layer being active for oxidizing CO and HCs under emission and temperature conditions associated with advanced combustion diesel engine operation.

7. The oxidation catalyst composite of claim 1, wherein one or both of the first refractory metal oxide support and the second refractory metal oxide support comprises one or more of alumina, silica, zirconia, titania and combinations thereof.

8. The oxidation catalyst composite of claim 1, wherein one or both of the first and second washcoat layers further comprises one or more of zeolites, alkaline earth oxides, rare earth oxides and base metal oxides.

9. The oxidation catalyst composite of claim 1, further comprising an undercoat layer substantially free of precious group metal component, the undercoat layer applied to the carrier substrate beneath one or both of the first washcoat zone and the second washcoat zone.

10. The oxidation catalyst composite of claim 1, wherein the first support comprises ceria and a molecular sieve comprising a zeolite selected from the group consisting of beta-zeolite, ZSM-5, and zeolite-Y.

11. The oxidation catalyst composite of claim 1, wherein the catalyst composite has a total loading of platinum and palladium in the range of about 30 g/ft$^3$ to 350 g/ft$^3$.

12. A method for treating a traditional diesel exhaust gas stream or an advanced combustion diesel exhaust gas stream comprising passing the exhaust gas stream through an inlet end towards an outlet end of a catalyzed soot filter, the exhaust gas first passing through a first washcoat zone on the filter comprising a first washcoat layer including one or more of platinum (Pt) and palladium (Pd) components and a first refractory metal oxide support, and then passing the exhaust gas stream through a second washcoat zone on the filter comprising a second washcoat layer including a platinum component and a second refractory metal oxide support, wherein at least 50% of the platinum components are located in the second washcoat zone; and wherein the second washcoat layer is substantially free of palladium.

13. The method of claim 12, wherein the filter has a length and first washcoat zone extends over the entire length of the filter and the second washcoat zone completely overlaps the first washcoat zone.

14. The method of claim 12, wherein the first washcoat zone extends from the inlet end along about 5% to 95% of the length of the filter and the second washcoat zone extends from the outlet end along about 5% to 95% of the length of the filter.

15. The method of claim 14, wherein one of the first zone and the second washcoat zone overlap the other.

16. The method of claim 12, wherein the platinum and palladium are present in the overall catalyst composite in a platinum to palladium ratio of from about 1:10 to about 4:1.

17. The method of claim 12, wherein one or both of the first refractory metal oxide support and the second refractory metal oxide support comprises one or more of alumina, silica, zirconia, titania and combinations thereof.

18. The method of claim 12, wherein one or both of the first and second washcoat layers further comprises one or more of zeolites, alkaline earth oxides, rare earth oxides and base metal oxides.

19. The method of claim 12, wherein the filter further comprises an undercoat layer substantially free of precious group metal component, the undercoat layer applied to the filter beneath one or more of the first washcoat zone and the second washcoat zone.

20. The method of claim 12, wherein the first support comprises ceria and the molecular sieve comprises a zeolite selected from the group consisting of beta-zeolite, ZSM-5 and zeolite-Y.

21. The method of claim 12, further comprising directing diesel exhaust gas to a selective catalytic reduction (SCR) catalytic article located downstream of the catalyzed soot filter (CSF).

22. The method of claim 12 comprising oxidizing CO and HCs under emission and temperature conditions associated with advanced combustion diesel engine operation.

* * * * *